US012687645B2

(12) United States Patent
Baek et al.

(10) Patent No.: US 12,687,645 B2
(45) Date of Patent: Jul. 21, 2026

(54) X-RAY DETECTOR AND OPERATION METHOD THEREOF

(71) Applicant: LG ELECTRONICS INC., Seoul (KR)

(72) Inventors: Seungchan Baek, Seoul (KR); Seonghwan Kim, Seoul (KR); Youngsoo Park, Seoul (KR); Sangjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 18/561,662

(22) PCT Filed: Jun. 30, 2021

(86) PCT No.: PCT/KR2021/008304
§ 371 (c)(1),
(2) Date: Nov. 16, 2023

(87) PCT Pub. No.: WO2023/277221
PCT Pub. Date: Jan. 5, 2023

(65) Prior Publication Data
US 2024/0159920 A1      May 16, 2024

(51) Int. Cl.
*G01T 1/17*          (2006.01)

(52) U.S. Cl.
CPC ..................................... *G01T 1/17* (2013.01)

(58) Field of Classification Search
CPC .... G01T 1/17; G01T 1/20; G01T 1/24; H04N 23/6812; H04N 23/30; H04N 25/30; H10F 39/12
See application file for complete search history.

(56) References Cited

U.S. PATENT DOCUMENTS 7,127,032 B1    10/2006   Kump
9,408,581 B2    8/2016   Hyde et al.
(Continued)

FOREIGN PATENT DOCUMENTS

JP       2005003755       1/2005
JP       2007-105112      4/2007
(Continued)

OTHER PUBLICATIONS

PCT International Application No. PCT/KR2021/008304, International Search Report dated Mar. 24, 2012, 4 pages.
(Continued)

*Primary Examiner* — Edwin C Gunberg
*Assistant Examiner* — Richard O Toohey
(74) *Attorney, Agent, or Firm* — LEE, HONG, DEGERMAN, KANG & WAIMEY

(57) ABSTRACT

The present disclosure is for minimizing the problem of AED sensor malfunction, and comprises: a panel having a plurality of sensing elements for sensing an X-ray, and converting an X-ray into an electrical signal; an AED sensor for sensing an X-ray; and a main control unit for obtaining image data by reading out the charge of the panel when an X-ray is sensed by the AED sensor, wherein the main control unit may determine whether or not reading out is to be performed on the basis of the acceleration of the panel even when the AED sensor senses an X-ray.

6 Claims, 5 Drawing Sheets

(56) References Cited

U.S. PATENT DOCUMENTS

| | | | |
|---|---|---|---|
| 2004/0252613 A1 | 12/2004 | Iwakiri | |
| 2006/0071172 A1 | 4/2006 | Ertel et al. | |
| 2014/0348299 A1 | 11/2014 | Sung et al. | |
| 2014/0376695 A1* | 12/2014 | Lee ......................... | H04N 25/30 |
| | | | 378/114 |
| 2014/0376700 A1 | 12/2014 | Kwak et al. | |
| 2015/0043715 A1 | 2/2015 | Kuwabara et al. | |
| 2018/0092617 A1* | 4/2018 | Schwartz ............. | A61B 6/4085 |
| 2019/0310382 A1 | 10/2019 | Scott et al. | |
| 2020/0033377 A1* | 1/2020 | Kim ..................... | A61B 6/4283 |
| 2020/0229781 A1 | 7/2020 | Lim | |
| 2022/0386982 A1* | 12/2022 | Jung ......................... | G01T 1/29 |

FOREIGN PATENT DOCUMENTS

| | | |
|---|---|---|
| JP | 2009034428 | 2/2009 |
| JP | 6704385 | 6/2020 |
| KR | 10-2014-0034018 | 3/2014 |
| KR | 10-2014-0148247 | 12/2014 |
| KR | 10-2018-0036570 | 4/2018 |
| KR | 10-2019-0037487 | 4/2019 |

OTHER PUBLICATIONS

Korean Intellectual Property Office Application No. 10-2023-7034647, Office Action dated Sep. 9, 2025, 3 pages.
Korean Intellectual Property Office Application No. 10-2023-7034647, Notice of Allowance dated Feb. 9, 2026, 1 pages.

* cited by examiner (a)

(b)

X-RAY DETECTOR AND OPERATION METHOD THEREOF

CROSS-REFERENCE TO RELATED APPLICATIONS

This application is the National Stage filing under 35 U.S.C. 371 of International Application No. PCT/KR2021/008304, filed on Jun. 30, 2021, the contents of which are hereby incorporated by reference herein its entirety.

TECHNICAL FIELD

The present disclosure relates to an X-ray detector and a method of operating the same.

BACKGROUND ART

X-rays are electromagnetic waves with a wavelength of 10 to 0.01 nanometers and a frequency between 3×1016 hertz and 3×1019 hertz. X-rays have strong penetrability and make the inside of an object seen, whereby being widely used in the medical field and non-destructive testing.

For example, when a generator generates X-rays, the X-rays may pass through an object and enter a detector, and the detector may analyze the incident radiation and output an X-ray image of the object.

Meanwhile, this detector may be equipped with an automatic exposure detection (AED) sensor. The AED sensor is configured to detect exposure of X-rays, automatically analyze the incident X-rays, and output X-ray images. In other words, when the AED sensor is provided, it is possible to automatically output X-ray images without separate connection with the generator.

However, the AED sensor may have high sensitivity to detect even small exposures of X-rays, and in this case, incorrect operation may occur due to external shock or contact rather than incidence of X-rays.

INVENTION

Technical Problem

The present disclosure is to minimize incorrect operation of an AED sensor.

The present disclosure is to provide a detector for detecting cases where an AED sensor wrongly detects incidence of X-rays due to external shock or contact, and a method of operating the same.

The present disclosure is to provide a detector in which an AED sensor operates only when X-rays are actually incident and a method of operating the same.

Technical Solution

A detector according to an embodiment of the present disclosure may comprise a panel comprising a plurality of sensing elements capable of detecting X-rays and configured to convert X-rays into an electrical signal, an automatic exposure detection (AED) sensor configured to detect the X-rays, and a main controller configured to read-out charges of the panel to obtain image data when the X-rays are detected through the AED sensor. The main controller may determine whether to perform read-out based on acceleration of the panel even if the AED sensor detects the X-rays.

The detector may further comprise an acceleration sensor configured to detect the acceleration of the panel.

The main controller may output a notification about shock of the detector based on the acceleration of the panel.

The main controller may perform read-out, when a sensor value of the AED sensor exceeds a first threshold value and a sensor value of the acceleration The detector may further comprise a trigger signal determination unit configured to generate a trigger signal to perform read-out, when the sensor value of the AED sensor exceeds the first threshold value and the sensor value of the acceleration sensor is less than or equal to the second threshold value.

The main controller may not perform read-out, when a sensor value of the AED sensor exceeds a first threshold value and a sensor value of the acceleration sensor exceeds a second threshold value.

The main controller may determine that sensing of the AED sensor is misdetection, when the sensor value of the AED sensor exceeds the first threshold value and the sensor value of the acceleration sensor exceeds the second threshold value.

The main controller may determine whether to store the image data based on the image data obtained after performing read-out, when a sensor value of the AED sensor exceeds a first threshold value and a sensor value of the acceleration sensor exceeds a second threshold value.

The main controller may store the image data, when the sensor value of the AED sensor exceeds the first threshold value, the sensor value of the acceleration sensor exceeds the second threshold value and an object is detected from an image based on the obtained image data.

The main controller may not store the image data, when the sensor value of the AED sensor exceeds the first threshold value, the sensor value of the acceleration sensor exceeds the second threshold value and an object is not detected from an image based on the obtained image data.

Effect of the Invention

According to an embodiment of the present disclosure, incorrect operation of the AED sensor can be minimized.

According to an embodiment of the present disclosure, even if the sensitivity of the AED sensor is increased, the possibility of incorrect operation is minimized, and thus, quick detection is possible with a small dose, which has the advantage of improving image quality and reducing exposure dose.

According to an embodiment of the present disclosure, since the AED sensor performs read-out only when X-rays are actually incident, there is an advantage in minimizing unnecessary read-out.

According to an embodiment of the present disclosure, since the AED sensor performs read-out only when X-rays are actually incident, there is an advantage of reducing power consumption due to read-out.

According to an embodiment of the present disclosure, since external shock or external contact is detected through an acceleration sensor, additional parts are not required, which has an advantage of minimizing an increase in product volume or manufacturing cost.

BEST MODE

Hereinafter, embodiments related to the present invention will be described in more detail with reference to the drawings. The suffixes "module" and "unit" for components used in the following description are given or used interchangeably only for the ease of description of the specification, and do not have distinct meanings or roles in themselves.

Figure 1:
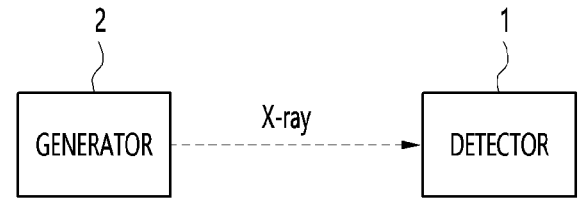
FIG. 1 is a diagram showing a generator and a detector according to an embodiment of the present disclosure.

FIG. 1 is a diagram showing a generator and a detector according to an embodiment of the present disclosure.

X-ray refer to radiation with strong penetrating power emitted when fast electrons collide with an object. These X-rays are widely used to take images of the human body, including the chest, abdomen, and skeleton, and their range of use is diverse.

In order to take an X-ray image, a generator 2 that generates X-rays and a detector 1 that detects X-rays may be required.

The shooting target of the X-ray image may be located between the generator 2 and the detector 1. Therefore, the X-rays emitted from the generator 2 may pass through the shooting target and reach the detector 1. The detector 1 detects the X-rays emitted from the generator 2, and the sizes of the X-rays detected at points may be different due to the shooting target. The detector 1 may output an X-ray image using the sizes of the X-rays detected at points.

Figure 2:
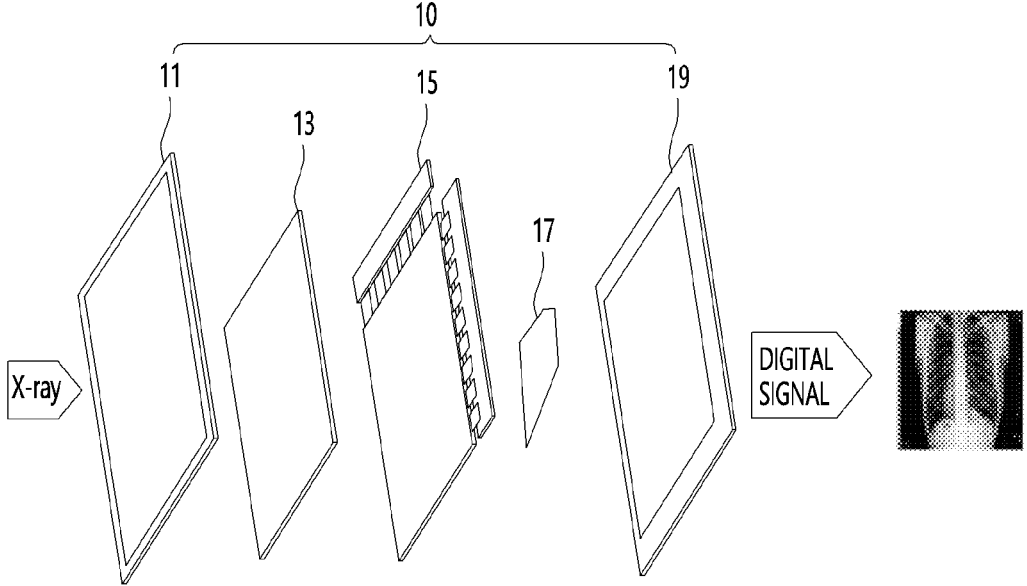
FIG. 2 is an exploded diagram showing a panel of a detector according to an embodiment of the present disclosure.

FIG. 2 is an exploded diagram showing a panel of a detector according to an embodiment of the present disclosure.

The detector 1 may include a panel 10, and the panel 10 may be a light receiving unit that receives X-rays.

The panel 10 consists of a plurality of sensing elements capable of detecting X-rays in a matrix form and may convert the X-rays into an electrical signal.

The panel 10 may include a case 11, a scintillator 13, a TFT 15, an AED sensor 17, and a control circuit 19.

The case 11 may protect the components placed inside the panel 10. The case 11 may cover the scintillator 13, the TFT 15, the AED sensor 17 and the control circuit 19.

The scintillator 13 may include a fluorescent material that glows when radiation hits it. The scintillator 13 may emit visible light when X-rays are irradiated.

The TFT 15 may be a thin film transistor. The TFT 15 may be an oxide thin film transistor.

The AED sensor 17 may detect whether X-rays have entered the panel 10. The AED (Automatic Exposure Detection) sensor 17 may control a main controller 110 (see FIG. 4) to output an X-ray image by detecting whether X-rays are incident. In other words, the AED sensor 17 may be configured so that the detector 1 automatically detects X-rays and outputs an X-ray image even if there is no signal connection between the generator 2 and the detector 1.

Figure 4:
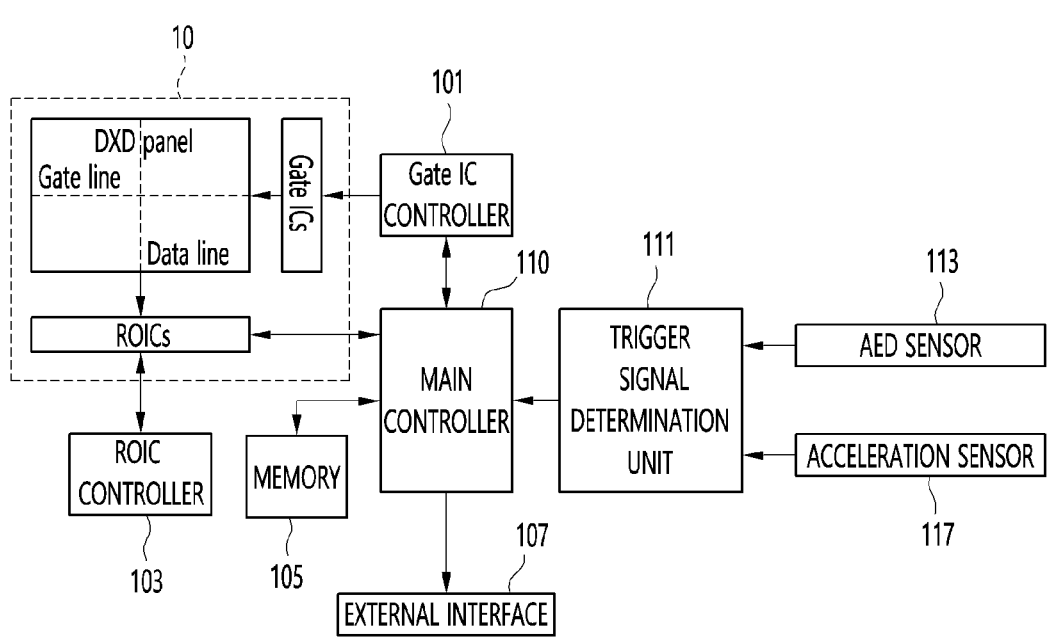
FIG. 4 is a control block diagram of a detector according to an embodiment of the present disclosure.

The AED sensor 17 may generate a trigger signal when detecting X-rays and transmit the trigger signal to the main controller 110 (see FIG. 4). Upon receiving the trigger signal, the main controller 110 may convert the detected X-rays into a digital signal and output an X-ray image. In other words, the trigger signal may be a command that causes the detector 1 to start an operation required to output the X-ray image.

Figure 5:
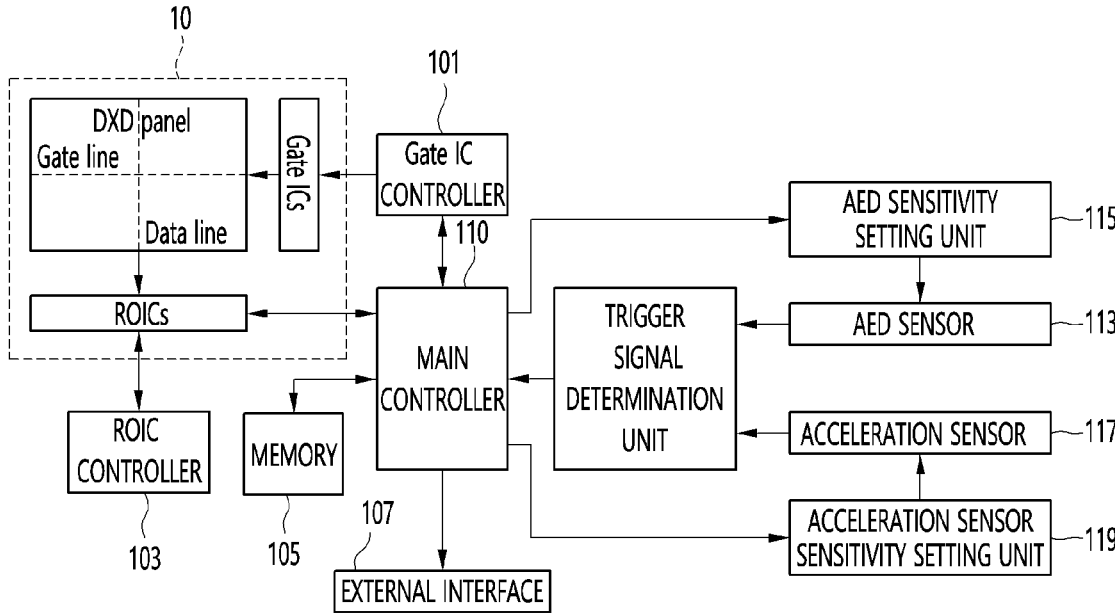
FIG. 5 is a control block diagram of a detector according to another embodiment of the present disclosure.

The control circuit 19—may have various control configuration necessary for the operation of the detector 1, discussed further with respect to the examples of FIGS. 4 and 5.

In addition, although not shown in FIG. 2, the panel 10 may further include a plate (not shown), and the plate (not shown) may be placed between the TFT 15 and the AED sensor 17 or between the AED sensor 17 and the control circuit 19. The plate (not shown) may be made of lead, which may minimize the effect of X-rays on the control circuit 19. That is, the plate (not shown) may block at least some of the X-rays to prevent the X-rays from reaching the control circuit 19.

The control circuit 19 may output the X-ray image by converting the detected X-rays into the digital signal.

On the other hand, if the X-ray sensitivity of the AED sensor 17 is too low, the X-rays may not be detected and thus the trigger signal may not be generated to output the X-ray image. In addition, the dose unnecessarily irradiated to a person to be subjected to X-ray imaging increases, which will be explained in more detail with reference to FIG. 3.

Figure 3:
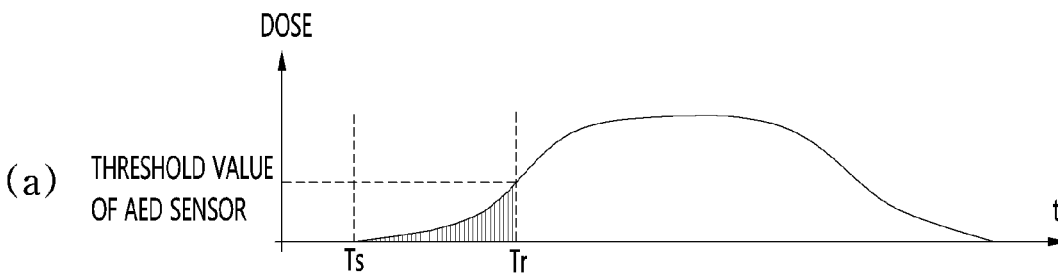
FIG. 3 is a graph showing a dose according to X-ray sensitivity of an AED sensor according to an embodiment of the present disclosure.
Figure 3:
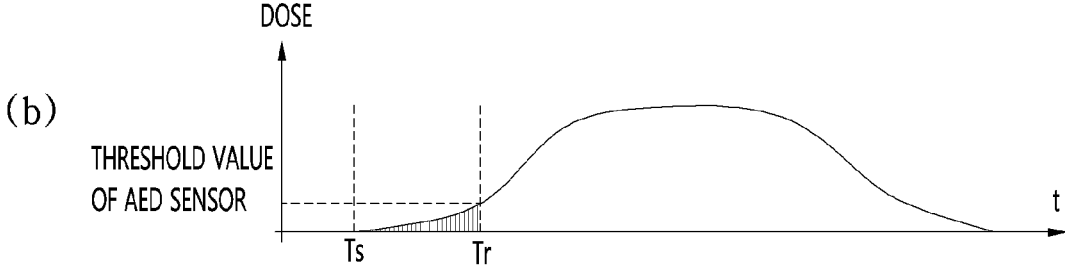

FIG. 3 is a graph showing a dose according to X-ray sensitivity of an AED sensor according to an embodiment of the present disclosure.

In particular, (a) of FIG. 3 shows a case where the X-ray sensitivity of the AED sensor 17 is lower compared to FIG. 3 (*b*). The lower the X-ray sensitivity, the higher the threshold value. That is, the threshold value of the AED sensor in (a) of FIG. 3 is greater than the threshold value of the AED sensor in (b) of FIG. 3. In the case shown in (a) of FIG. 3, the dose required for the AED sensor 17 to detect that X-rays are incident is greater than the dose required in the case shown in (b) of FIG. 3.

Specifically, Ts may indicate a start point of X-ray irradiation, and Tr may indicate a point in time at which the AED sensor 17 generates a trigger signal. Referring to (a) of FIG. 3, since the X-ray sensitivity is low, a first time is taken from Ts to Tr. In the case of (b) of FIG. 3, since the X-ray sensitivity is high, it takes a second time, which is shorter than first time, from Ts to Tr. Accordingly, the area of the graph representing the dose from Ts to Tr is larger in (a) of FIG. 3 than in (b) of FIG. 3, which means that the loss of dose in (a) of FIG. 3 is greater than the loss of dose in (b) of FIG. 3. Therefore, image quality deteriorates, and if an attempt is made to improve image quality, there is a disadvantage in that a person receives more X-rays unnecessarily, increasing radiation exposure.

On the other hand, when the X-ray sensitivity of the AED sensor 17 is too high, even though X-rays are not actually incident, incorrect operation that generates a trigger signal may occur due to external environments such as external shock, contact, electrical noise.

Accordingly, the detector 1 according to an embodiment of the present disclosure is to increase the X-ray sensitivity of the AED sensor 17 and minimize incorrect operation. In particular, the detector 1 according to an embodiment of the present disclosure is to complement the detection result of the AED sensor 17 by using a change in acceleration.

FIG. 4 is a control block diagram of a detector according to an embodiment of the present disclosure.

The detector 1 according to the embodiment of the present disclosure may include a panel 10, a gate IC controller 101, a ROIC controller 103, a memory 105, an external interface 107, a main controller 110, a trigger signal determination unit 111, an AED sensor 113 and acceleration sensor 117.

In the panel 10, a plurality of sensing elements capable of detecting X-rays are configured in a matrix form, and the X-rays detected through the sensing elements may be converted into an electrical signal.

In addition, the panel 10 is equipped with gate ICs and ROICs.

The gate IC controller 101 may perform scan operation for reading out the electrical signal of the panel 10.

The ROIC reads out the electrical signal of the panel 10, and the ROIC controller 103 may control the read-out operation according to the settings of the ROIC and a constant clock signal.

The memory 105 may store data necessary for operation of the detector 1.

In addition, the memory 105 may store image data obtained through read-out. That is, the memory 105 may store the read image data.

The external interface 107 may be connected to an external device (not shown). The external interface may transmit the image data to the outside (e.g., a server).

The trigger signal determination unit 111 may determine whether a trigger signal is generated. The trigger signal determination unit 111 may obtain the sensing value of the AED sensor from the AED sensor 113 and obtain the sensing value of the acceleration sensor 117. The trigger signal determination unit 111 may determine whether a trigger signal is generated based on the sensing value of the AED sensor and the sensing value of the acceleration sensor.

The trigger signal determination unit 111 checks whether a shock detection signal is received from the acceleration sensor 117 when X-ray irradiation is detected by the AED sensor 113, determines that the detection signal of the AED sensor 113 is misdetection by shock when the shock signal is received, and determines that the detection signal of the AED sensor is a normal AED signal to generate a trigger signal when the shock detection signal is not received.

The main controller 110 may read out the charges of the panel 10 through the ROIC controller 103 and the gate IC controller 101 using the trigger signal from the trigger signal determination unit 111.

The trigger signal may be a signal that determines whether to perform read-out.

The AED sensor 113 may be a sensor that compares the detected X-ray dose with a threshold value to determine whether to initiate read-out.

The acceleration sensor 117 may be a sensor that calculates the acceleration of the detector 1. The acceleration sensor 117 may detect external shock or touch applied to the panel 10 or the detector 1. That is, the acceleration sensor 117 may detect minute vibration or movement applied to panel 10 or the detector 1.

According to one embodiment, the acceleration sensor 117 may detect the acceleration of the detector 1 and calculate information about an external shock or load applied to the detector 1 based on the detected acceleration. That is, the main controller 110 may obtain information about external shock or load through the acceleration sensor 117, and output a notification about the use or management of the detector 1 based on this information. For example, the main controller 110 may manage shock information history and output a damage notification based on information about shock, load, etc.

In addition, the main controller 110 may minimize incorrect operation of the AED sensor 113 through the sensing value of the acceleration sensor 117. If the AED sensor 113 has high sensitivity, it may sense that X-rays are incident due to external shock or contact even when X-rays are not actually incident. Therefore, when the main controller 110 detects the incidence of X-rays through the AED sensor 113, it may determine whether the detection of the AED sensor 113 is a normal operation or an incorrect operation through the acceleration sensor 117. In particular, the main controller 110 may detect incorrect operation of the AED sensor 113 by comparing the sensor value of the acceleration sensor 117 with a threshold value. The main controller 110 may determine that the X-ray detection of the AED sensor 113 is incorrect operation when the sensor value of the acceleration sensor 117 exceeds the threshold value and determine that the X-ray detection of the AED sensor 113 is a normal operation when the sensor value of the acceleration sensor 117 is less than or equal to the threshold value. This will be explained in more detail in FIGS. 6 and 7.

Meanwhile, according to the embodiment, the detector 1 may further include an AED sensitivity setting unit 115 and an acceleration sensor sensitivity setting unit 119.

FIG. 5 is a control block diagram of a detector according to another embodiment of the present disclosure.

As shown in FIG. 5, the detector 1 includes a panel 10, a gate IC controller 101, a ROIC controller 103, a memory 105, an external interface 107, a main controller 110, and a trigger signal determination unit 111, an AED sensor 113, an acceleration sensor 117, an AED sensitivity setting unit 115, and an acceleration sensor sensitivity setting unit 119.

A repeated description of FIG. 4 will be omitted.

The AED sensitivity setting unit 115 may set the X-ray sensitivity of the AED sensor 113. The AED sensitivity setting unit 115 may increase or decrease the X-ray sensitivity of the AED sensor 113. The AED sensitivity setting unit 115 may set a threshold value for detection of the AED sensor 113. The AED sensor 113 may determine that X-rays have been irradiated when the sensing data is greater than or equal to a set threshold value.

The acceleration sensor sensitivity setting unit 119 may set the sensitivity of the acceleration sensor 117. The acceleration sensor sensitivity setting unit 119 may increase or decrease the sensitivity of the acceleration sensor 117.

When the acceleration sensor sensitivity setting unit 119 arbitrarily sets the sensitivity of the acceleration sensor 117 using detectable shock information, the sensitivity of the AED sensor 113 may be indirectly adjusted.

The acceleration sensor sensitivity setting unit 119 may set a threshold value to determine the presence of external shock or touch. When the data exceeds the threshold value, the acceleration sensor 117 determines that external shock has occurred and generates an shock detection signal.

Figure 6:
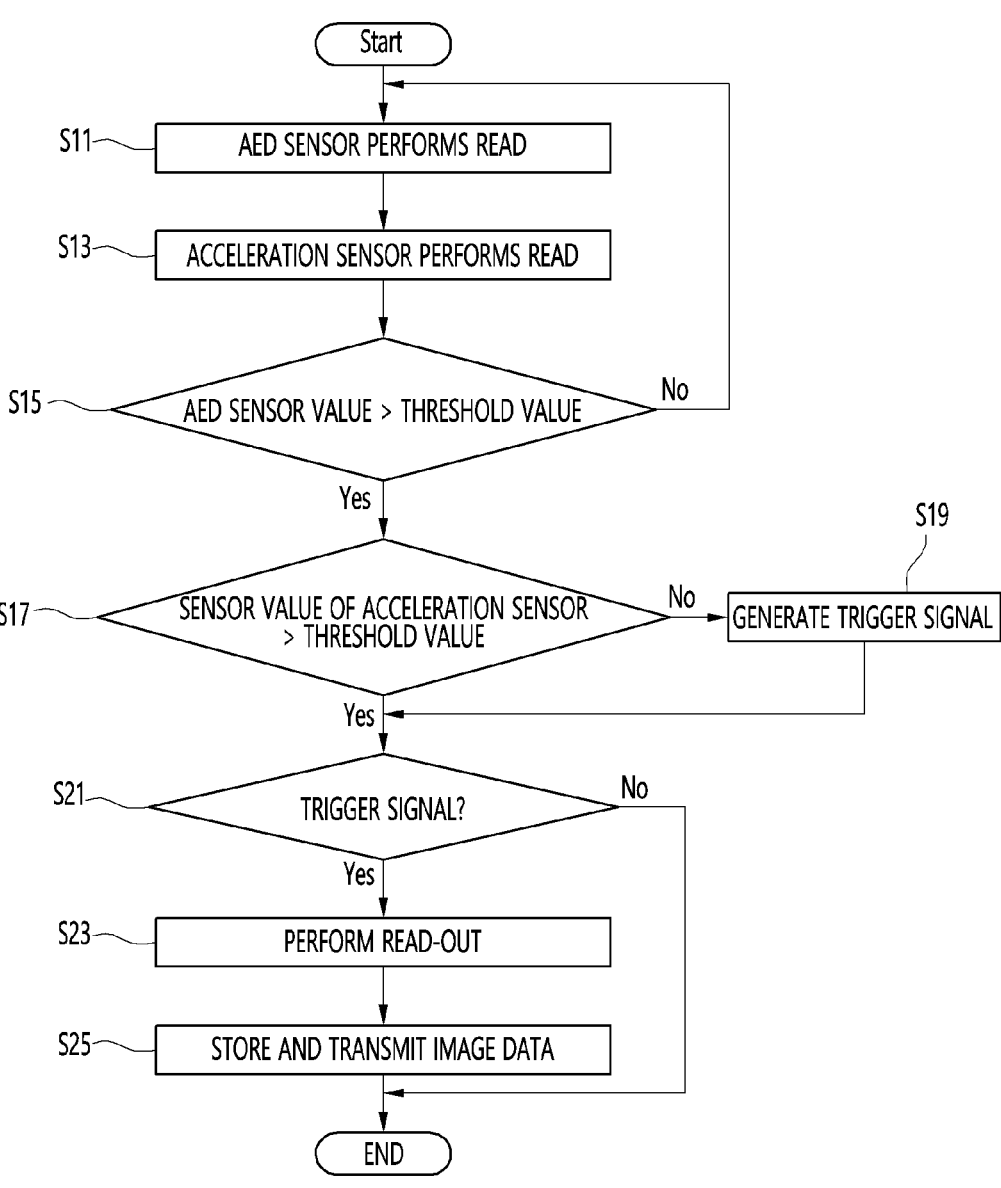
FIG. 6 is a flowchart illustrating a method of operating a detector according to a first embodiment of the present disclosure.

FIG. 6 is a flowchart illustrating a method of operating a detector according to a first embodiment of the present disclosure.

According to the first embodiment of the present disclosure, the AED sensor 113 may perform read (S11), and the acceleration sensor 117 may also perform read (S13).

Here, performing read may mean that each sensor obtains a sensing value. That is, the AED sensor 113 and the acceleration sensor 117 may periodically perform sensing and obtain sensing values. Steps S11 and S13 may be performed simultaneously, or their order may be changed.

The sensing value of the AED sensor 113, that is, the AED sensor value, and the sensing value of the acceleration sensor 117, that is, the sensor value of the acceleration sensor, may be transmitted to the trigger signal determination unit 111.

The trigger signal determination unit 111 may determine whether the AED sensor value is greater than the threshold value (first threshold value) (S15).

That is, the trigger signal determination unit 111 may compare the AED sensor value with the threshold value to determine whether the AED sensor value is greater than or less than the threshold value. The AED sensor value refers to the sensing value of the AED sensor 113, and the threshold value may refer to a constant determined by the sensitivity of the AED sensor 113.

When the AED sensor value is equal to or less than the threshold value, the trigger signal determination unit 111 may recognize that X-rays are not incident. Therefore, when the AED sensor value is equal to or less than the threshold value, the AED sensor 113 may perform read, and the acceleration sensor 117 may also perform read.

Meanwhile, when the AED sensor value exceeds the threshold value, the trigger signal determination unit 111 may determine whether the sensor value of the acceleration sensor is greater than the threshold value (second threshold value) (S17).

That is, the trigger signal determination unit 111 may compare the sensor value of the acceleration sensor with the threshold value to determine whether the sensor value of the acceleration sensor is greater than or less than the threshold value. The sensor value of the acceleration sensor may refer to the sensing value of the acceleration sensor 117, and the threshold value may refer to a constant determined by the sensitivity of the acceleration sensor 117. Here, the threshold value may be a constant set to determine the presence or absence of an external shock or touch. That is, the threshold value is obviously different from the threshold value in step S15.

When the sensor value of the acceleration sensor exceeds the threshold value, the trigger signal determination unit 111 may determine that external shock or touch has occurred. That is, the trigger signal determination unit 111 may determine that the AED sensor value exceeds the threshold value due to misrecognition caused by external shock or touch.

On the other hand, when the sensor value of the acceleration sensor is less than or equal to the threshold value, the trigger signal determination unit 111 may recognize that no external shock or touch has occurred. That is, the trigger signal determination unit 111 may recognize that the AED sensor value exceeds the threshold value as a sensing result due to incidence of X-rays, and generate a trigger signal accordingly (S19).

That is, the trigger signal determination unit 111 may continuously obtain the AED sensor value and the sensor value of the acceleration sensor, and generate a trigger signal only when the AED sensor value exceeds the threshold value and the sensor value of the acceleration sensor is less than or equal to the threshold value.

Meanwhile, the main controller 110 may determine whether a trigger signal is generated (S21).

The main controller 110 may not perform a separate operation if a trigger signal is not generated.

The main controller 110 may perform read-out when a trigger signal is generated.

Here, read-out may mean obtaining the X-ray sensing value of the panel 10. The main controller 110 may obtain image data using the X-ray sensing value. That is, the main controller 110 may obtain image data through read-out.

The main controller 110 may store and transmit image data (S23).

That is, the main controller 110 may store the image data and transmit it to a display (not shown).

According to the first embodiment, even if the sensitivity of the AED sensor is increased, the problem of unnecessarily performing read-out due to external factors such as shock or touch can be minimized. That is, according to the first embodiment, a read-out operation due to incorrect sensing of the AED sensor can be prevented.

Meanwhile, according to the second embodiment of the present disclosure, the detector 1 performs read-out first, but may also determine whether the AED sensor has sensed incorrectly through image data. This is to minimize the problem of not being able to perform read-out even though the user intended to take an actual X-ray image. The second embodiment will be described in detail with reference to FIG. 7.

Figure 7:
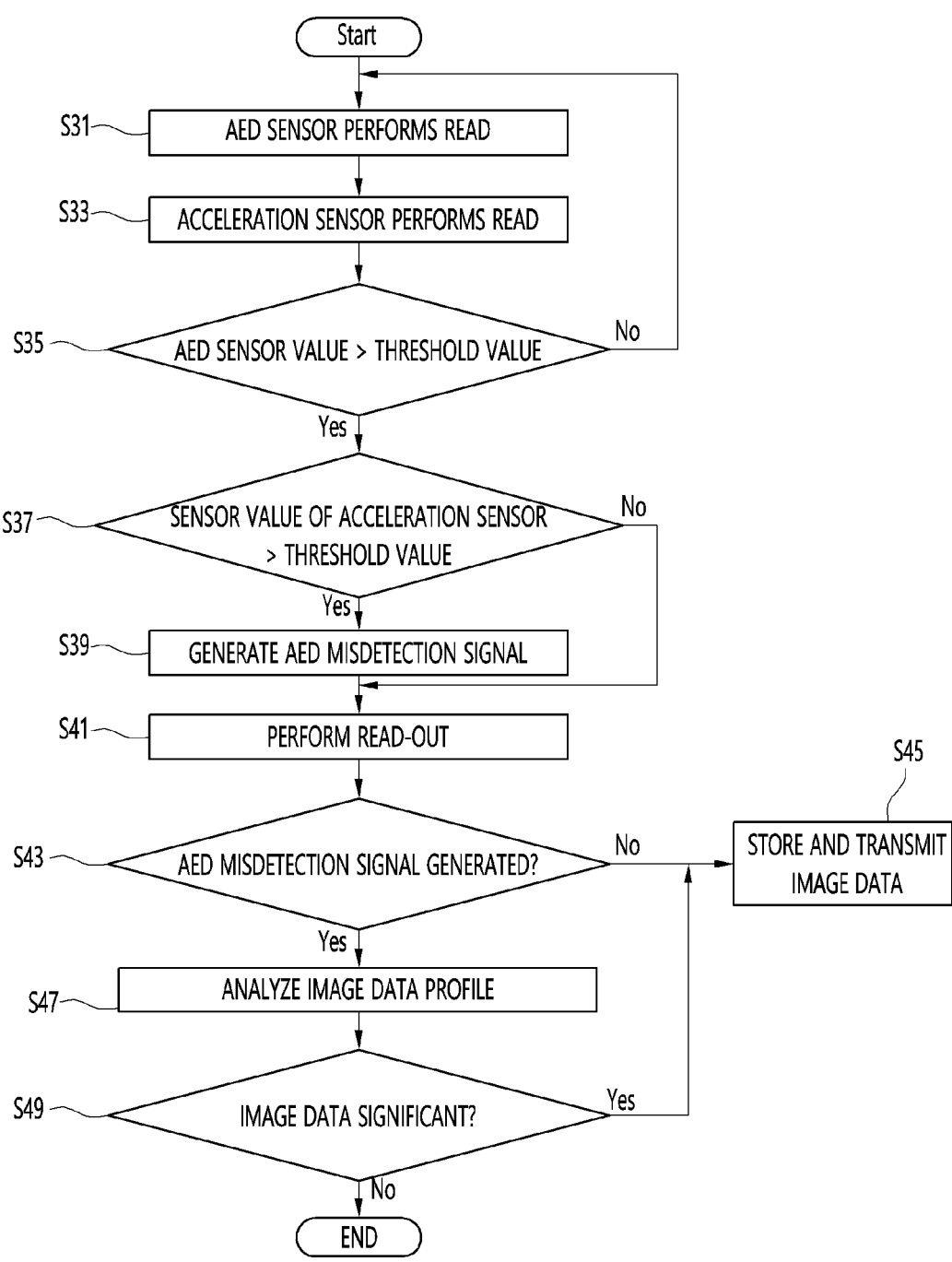
FIG. 7 is a flowchart illustrating a method of operating a detector according to a second embodiment of the present disclosure.

FIG. 7 is a flowchart illustrating a method of operating a detector according to a second embodiment of the present disclosure.

According to the second embodiment of the present disclosure, the AED sensor 113 may perform read (S31), and the acceleration sensor 117 may also perform read (S33).

Since steps S31 and S33 are the same as steps S11 and S13 of FIG. 6, respectively, a repeated description will be omitted.

The trigger signal determination unit 111 may determine whether the AED sensor value is greater than the threshold value (first threshold value) (S35).

That is, the trigger signal determination unit 111 may compare the AED sensor value with the threshold value to determine whether the AED sensor value is greater than or less than the threshold value. The AED sensor value refers to the sensing value of the AED sensor 113, and the threshold value may refer to a constant determined by the sensitivity of the AED sensor 113.

If the AED sensor value is less than or equal to the threshold value, the trigger signal determination unit 111 may recognize that X-rays are not incident. Therefore, when the AED sensor value is less than or equal to the threshold value, the AED sensor 113 may perform read, and acceleration sensor 117 may also perform read.

Meanwhile, when the AED sensor value exceeds the threshold value, the trigger signal determination unit 111 may determine whether the sensor value of the acceleration sensor is greater than the threshold value (second threshold value) (S37).

That is, the trigger signal determination unit 111 may compare the sensor value of the acceleration sensor with the threshold value to determine whether the sensor value of the acceleration sensor is greater than or less than the threshold value. The sensor value of the acceleration sensor may refer to the sensing value of the acceleration sensor 117, and the threshold value may refer to a constant determined by the sensitivity of the acceleration sensor 117. Here, the threshold value may be a constant set to determine the presence or absence of external shock or touch. That is, the threshold value is obviously different from the threshold value in step S35.

When the sensor value of the acceleration sensor exceeds the threshold value, the trigger signal determination unit 111 may determine that external shock or touch has occurred. That is, the trigger signal determination unit 111 may determine that the AED sensor value exceeds the threshold value due to misrecognition caused by external shock or touch.

On the other hand, when the sensor value of the acceleration sensor is less than or equal to the threshold value, the trigger signal determination unit 111 may recognize that no external shock or touch has occurred. That is, the trigger signal determination unit 111 may recognize that the AED sensor value exceeds the threshold value as a sensing result due to incidence of X-rays.

Therefore, the trigger signal determination unit 111 generates an AED misdetection signal when the sensor value of the acceleration sensor exceeds the threshold value (S39), and may not separately generate an AED misdetection signal when the sensor value of the acceleration sensor is less than or equal to the threshold.

The AED misdetection signal may be a signal indicating that the X-ray detection of the AED sensor 113 is misdetection.

In addition, the main controller 110 may perform read-out (S41).

That is, when the sensor value of the AED sensor 113 exceeds the first threshold value and the sensor value of the acceleration sensor 117 exceeds the second threshold value, the main controller 110 performs read-out and then determine whether to store the image data based on the image data.

Here, read-out may mean obtaining the X-ray sensing value of the panel 10. The main controller 110 may obtain image data using the X-ray sensing value. That is, the main controller 110 may obtain image data through read-out.

The main controller 110 may determine whether an AED misdetection signal is generated after read-out (S43).

The main controller 110 may store and transmit the image data when the AED misdetection signal is not generated (S45).

That is, the main controller 110 may store the image data and transmit it to a display (not shown).

Meanwhile, the main controller 110 may analyze an image data profile when the AED misdetection signal is generated (S47).

That is, the main controller 110 may analyze the image data obtained through read-out.

The main controller 110 may determine whether the image data is significant after analyzing the image data (S49).

The significance of the image data means that the image data is determined to be an actual X-ray image of a specific object. If read-out is performed due to incorrect operation, there will be no object, target, in the X-ray image.

Therefore, according to one embodiment, the main controller 110 may determine whether the image data is significant by analyzing the image data and detecting the presence or absence of an object. The main controller 110 may determine that the image data is significant when an object is detected as a result of analyzing the image data, and may determine that the image data is insignificant when the object is not detected.

When the image data is significant, the main controller 110 may store and transmit the image data. On the other hand, the main controller 110 may not perform any operation if the image data is insignificant.

For example, the main controller 110 may store the image data when an object is detected in the image based on the obtained image data, and may not store the image data if the object is not detected in the image.

That is, according to the second embodiment, the main controller 110 performs read-out and then determine whether to store (or transmit) the image data based on the obtained image data, when the sensor value of the AED sensor 113 exceeds the first threshold value and the sensor value of the acceleration sensor 117 exceeds the second threshold value.

As such, according to the second embodiment, there is an advantage of being able to detect incorrect operation of the AED sensor 113 more accurately by first performing read-out and then analyzing the image data.

In summary, the detector 1, which has an automatic exposure detection (AED) sensor 113, is equipped with one or more acceleration sensors 117 to control the AED operation, and at this time, in the acceleration sensor 117, an arbitrary threshold value may be set to determine whether external shock, contact, vibration, etc. occurs. When a change in the sensing value of the acceleration sensor 117 due to external shock or contact exceeds a threshold value, a shock detection signal may be generated. When a trigger signal is generated in the AED sensor 117, the main controller 110 checks whether or not a shock detection signal is generated from the acceleration sensor 117, and determine that the trigger signal is due to misdetection caused by shock when the shock detection signal is generated. The main controller 110 checks whether the shock detection signal of the acceleration sensor 117 is generated when a trigger signal is generated in the AED sensor 117, and determine that the trigger signal is generated due to normal X-ray irradiation when no shock detection signal is generated. Upon determining that the trigger signal is generated due to normal X-ray irradiation, the main controller 110 may read out the image data of the panel 10 and store it or transmit it to the server. Upon determining that the trigger signal is generated due to misdetection, the main controller 110 may prevent progress to step of reading out the image data of the panel 10 or prevent step of storing or transmitting the already read-out image to the server and release the trigger and shock detection signals. The shock detection sensitivity may be adjusted by setting the threshold value of the acceleration sensor 117, and the sensitivity of the AED sensor 113 may be indirectly adjusted through this. By analyzing the shock detection signal of the acceleration sensor 117 and the profile of the read-out image signal, it is possible to more accurately determine whether a normal trigger has occurred or a misdetection trigger has occurred due to noise.

In the first embodiment, the main controller 110 may determine that sensing of the AED sensor 113 is misdetection, when the sensor value of the AED sensor 113 exceeds the first threshold value and the sensor value of the acceleration sensor 117 exceeds the second threshold value. In the second embodiment, when the sensor value of the AED sensor 113 exceeds the first threshold value and the sensor value of the acceleration sensor 117 exceeds the second threshold value, the main controller 110 may perform read-out and then determine whether to store the image data based on the obtained image data. That is, in the second embodiment, the main controller 110 may determine whether sensing of the AED sensor 113 is misdetection based on the image data, even if the sensor value of the AED sensor 113 exceeds the first threshold value and the sensor value of the acceleration sensor 117 exceeds the second threshold value.

In addition, according to the first or second embodiment, since the detector 1 determines incorrect operation of the AED sensor 113 according to the sensing value of the acceleration sensor 117, when the output signal of the acceleration sensor 117 is blocked, even if the AED sensor 113 reacts to external shock, incorrect operation may not be determined and thus read-out may be performed, thereby increasing power consumption. Meanwhile, when the output of the acceleration sensor 117 is transmitted normally, even if external shock is applied to the detector 1, the sensing of the AED sensor 113 may be ignored and read-out may not be performed. Therefore, a change in power consumption may not occur. That is, it can be confirmed that the acceleration sensor 117 is used to determine incorrect operation of the AED sensor 113.

The above description is merely illustrative of the technical spirit of the present disclosure, and various modifications and variations will be possible without departing from the essential characteristics of the present disclosure by those skilled in the art to which the present invention pertains.

Therefore, the embodiments disclosed in the present disclosure are not intended to limit the technical spirit of the present disclosure, but are intended to explain the technical spirit of the present disclosure, and the scope of the technical spirit of the present invention is not limited by these embodiments.

The scope of the present disclosure should be construed by the following claims, and all technical ideas within the equivalent range should be construed as being included in the scope of the present disclosure.

The invention claimed is:

1. A detector comprising:
   a panel comprising a plurality of sensors including a scintillator and an automatic exposure detection (AED) sensor capable of detecting X-rays and configured to convert X-rays into an electrical signal;
   an acceleration sensor configured to detect the acceleration of the panel;
   control circuitry including a trigger signal determination unit configured to generate a trigger signal based on a first sensor value of the AED sensor and a second sensor value of the acceleration sensor; and
   a main controller configured to read-out charges of the panel to obtain image data based on the generated trigger signal, wherein the trigger signal determination unit is configured to:
   obtain the first sensor value of the AED sensor and the second sensor value of the acceleration sensor,
   determine whether the first sensor value of the AED sensor is greater than a first threshold value,
   determine whether the second sensor value of the acceleration sensor is greater than a second threshold value when the first sensor value of the AED sensor is greater than the first threshold value, and
   generate the trigger signal when the second sensor value of the acceleration sensor is less than or equal to the second threshold value,
   wherein the main controller does not perform read-out and determines that sensing of the AED sensor is misdetection, when the first sensor value of the AED sensor exceeds the first threshold value and the second sensor value of the acceleration sensor exceeds the second threshold value.

2. The detector of claim 1, wherein the main controller is configured to output a notification informing about a shock of the detector based on the detected acceleration of the panel.

3. The detector of claim 1, wherein the main controller is configured to perform the read-out based on the first sensor value of the AED sensor exceeding the first threshold value and the second sensor value of the acceleration sensor being less than or equal to the second threshold value.

4. The detector of claim 3, wherein the trigger signal determination unit is configured to generate the trigger signal for performing the read-out further based on the sensor value of the AED sensor exceeding the first threshold value.

5. The detector of claim 3, wherein the main controller is configured to store image data resulting from the read-out in a memory based on detection of an object in the resulting image data.

6. The detector of claim 3, wherein the main controller is configured to not store the image data in the memory based on no objects being detected in the resulting image data.

* * * * *